United States Patent
Kunzl et al.

(10) Patent No.: US 10,414,325 B2
(45) Date of Patent: Sep. 17, 2019

(54) HEADLIGHT FOR MOTOR VEHICLES

(71) Applicant: Varroc Lighting Systems, s.r.o., Senov u Noveho Jicina (CZ)

(72) Inventors: Pavel Kunzl, Novy Jicin (CZ); Zdenek Svetlik, Dobratice (CZ)

(73) Assignee: VARROC LIGHTING SYSTEMS, S.R.O. (CZ)

( * ) Notice: Subject to any disclaimer, the term of this patent is extended or adjusted under 35 U.S.C. 154(b) by 0 days.

(21) Appl. No.: 16/142,194

(22) Filed: Sep. 26, 2018

(65) Prior Publication Data

US 2019/0100129 A1    Apr. 4, 2019

(30) Foreign Application Priority Data

Sep. 29, 2017   (CZ) ..................... 2017-593

(51) Int. Cl.
*B60Q 1/076* (2006.01)
*B60Q 1/068* (2006.01)

(52) U.S. Cl.
CPC .......... *B60Q 1/0683* (2013.01); *B60Q 1/076* (2013.01)

(58) Field of Classification Search
CPC .............. B60Q 1/0683; B60Q 1/076
See application file for complete search history.

(56) References Cited

U.S. PATENT DOCUMENTS

| | | | | |
|---|---|---|---|---|
| 4,188,655 A | * | 2/1980 | Tallon .................. | B60Q 1/0683 362/275 |
| 4,839,785 A | | 6/1989 | Ohishi .......................... | 362/418 |
| 4,954,933 A | * | 9/1990 | Wassen ..................... | B60Q 1/06 362/271 |
| 5,258,894 A | * | 11/1993 | Bivens ................. | B60Q 1/0683 362/273 |
| 2013/0088885 A1 | | 4/2013 | Wilson et al. ................ | 362/514 |

(Continued)

FOREIGN PATENT DOCUMENTS

| | | |
|---|---|---|
| CZ | 303 955 B6 | 7/2013 |
| DE | 100 36 771 B4 | 3/2007 |
| EP | 0 330 885 B1 | 5/1991 |

(Continued)

OTHER PUBLICATIONS

Search Report dated Jun. 25, 2018 in corresponding Czech Republic Application No. PV 2017-593.

*Primary Examiner* — Donald L Raleigh
(74) *Attorney, Agent, or Firm* — Ostrolenk Faber LLP (57) ABSTRACT

A headlight for motor vehicles including a supporting housing adapted for securing an optical unit. The optical unit is in the inner space of the supporting housing mounted on three displaceable mounting nodes, each of which includes one system point and the system points are grouped together constituting a system triangle, whereby at least some mounting nodes are coupled to adjusting members located in the outer space of the supporting housing. A primary mounting node is provided with means for turning the system triangle without changing the position of a primary system point, a secondary mounting node is provided with means for changing the position of a secondary system point in the horizontal plane and a tertiary mounting node is provided with means for changing the position of a tertiary system point in all directions of the coordinate system.

10 Claims, 9 Drawing Sheets

(56) References Cited

U.S. PATENT DOCUMENTS

2018/0118093 A1* 5/2018 Yamazumi ............ F21S 41/148

FOREIGN PATENT DOCUMENTS

| EP | 0 705 729 B1 | 1/2000 |
| EP | 1 762 430 B1 | 3/2010 |
| EP | 2218964 A2 | 8/2010 |
| EP | 2 762 358 A2 | 8/2014 |

* cited by examiner

HEADLIGHT FOR MOTOR VEHICLES

TECHNICAL FIELD

The invention relates to a headlight for motor vehicles equipped with an adjustment system of an optical system for providing the desired orientation of the output light beam direction.

BACKGROUND ART

Headlights that are installed in motor vehicles require initial adjustment of the desired direction of the light beam. For that purpose, the light beam direction must be adjusted already during the installation of a headlight assembly in the motor vehicle. In addition, due to vibrations and/or other forces acting on the vehicle during its operation, automatic or periodic adjustment is required to maintain the desired light beam direction over the service life of the vehicle. It is also necessary to adapt the light beam direction to the current operating conditions in which the vehicle is located. Therefore, the optical headlight assemblies are also provided with adjusting mechanisms to ensure the desired orientation changes in the light beam direction by the vehicle user.

Furthermore, it is required that the headlight adjustment point is accessible especially from the upper side of a supporting housing, so that the adjustment system can be adjusted in the vertical direction. However, the adjustment of the headlight assembly is performed especially in the horizontal direction. Known control devices generally include gears and/or other movable elements which mutually cooperate to ensure the motion of the individual components of the headlight assembly. The documents CZ303955, U.S. Pat. No. 4,839,785A, EP1762430B1, EP705729B1, EP330885B1, EP 2762358A2, DE10036771B4 disclose headlights of motor vehicles comprising a shaped supporting housing which is provided in its cavity with positionable mounting nodes in which an optical unit is fixed. The known arrangements are essentially based on a common concept, namely, that system points which define the motion of the optical unit—rotation or shift—are grouped into the so-called system triangle and by changing the position or turning the system points, the position and direction of the optical unit are adjusted. A common feature of the known solutions is that the individual system points are arranged on at least two mounting nodes which are coupled to each other to achieve the desired effect. These mounting nodes typically have one static mounting node and the other mounting nodes are movable. The static mounting node serves to ensure the rotary motion of the system triangle at one of the system points without changing the position of the system triangle. Other mounting nodes serve to ensure the required motion of the system triangle by changing the position of the respective system points which are configured as spherical, cylindrical or sliding structural elements.

However, a common disadvantage of the background art is the fact that there is a growing demand for a smaller installation space of the vehicle and hence of the headlights, whereby especially in the case of low height headlights it is generally difficult to obtain the desired distances within the small and low space of a headlight housing between a point of rotation of the system triangle and a sliding adjusting point of the system triangle. As a result of the insufficient distances of the system triangle adjustment points, there is a high sensitivity of the adjustment system to the tolerances and clearances in the individual components of the entire assembly and low stability of the light track position, when even a slight motion of the individual elements can cause significant disruption of the adjustment of the optical assembly and may cause, for example, dazzle to oncoming drivers. The insufficient distances of the adjusting points of the system triangle also result in overloading the drive of the adjustment mechanism. To eliminate the above-mentioned shortcomings, the known three-point systems of the headlight adjustment require a relatively large manipulating and installation space within the headlight housing.

The aim of the invention is to remove or at least reduce the drawbacks of the background art by providing a headlight with an adjustment system of an optical system which has a simple construction, is characterized by stability and, in addition, has lower requirements for the manipulating and installation space within the headlight housing.

PRINCIPLE OF THE INVENTION

The above-mentioned goal of the invention is achieved by a headlight whose principle consists in that a primary mounting node is provided with means for turning a system triangle without changing the position of a primary system point, a secondary mounting node is provided with means for changing a secondary system point in a horizontal plane and a tertiary mounting node is provided with means for changing the position of a tertiary system point in all directions of the coordinate system.

The present invention enables to use the adjustment system of the optical system even in low profile headlights while preserving a full range of adjustability of the adjusting elements and accessibility to them.

Preferred embodiments of the invention are the subject-matter of the dependent patent claims.

DESCRIPTION OF DRAWINGS

The present invention will be described in greater detail with reference to exemplary embodiments shown in the accompanying drawings, in which.

EXAMPLES OF EMBODIMENT

FIGS. 1, 2, 3, 4 and 5 show an embodiment of a headlight for motor vehicles comprising a shaped supporting housing 2 adapted to secure an optical unit in the inner space 14 of the supporting housing 2, wherein the optical unit 4 generates an unillustrated light beam in the direction of the X axis. The optical unit 4 is mounted in the inner space 14 of the supporting housing 2 by means of three mounting nodes 1a, 1b, 1c, which allow to change the position of system points 1a', 1b', 1c'. The system points 1a', 1b', 1c' are grouped into a system triangle 1 which defines the adjustability of the optical unit 4 direction and position.

A secondary mounting node 1b and a tertiary mounting node 1c are coupled to one adjusting member 10b, 10c, respectively, by which the respective mounting node 1b, 1c is controlled, thereby changing the position of the respective system point 1b', 1c'. Each of the adjusting members 10b, 10c is accessible from the outer space 15 of the headlight supporting housing 2.

Figure 3:
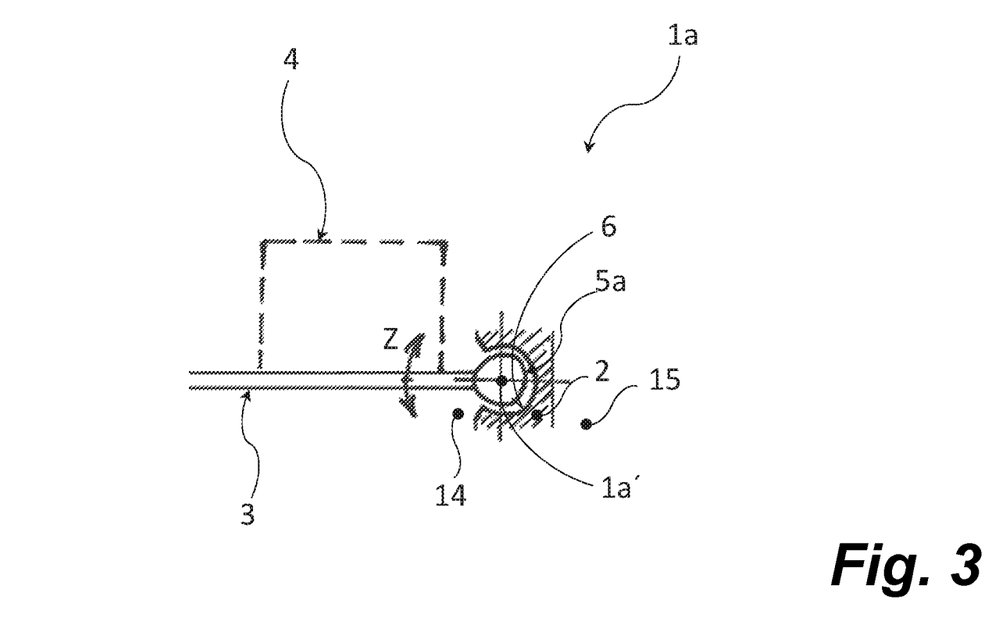
FIG. 3 is a schematic cross-sectional view (section A-A') of a primary mounting point of the system triangle of FIG. 2.

A primary mounting node 1a comprises a primary ball pivot 5a rotatably mounted in a spherical housing 6 on the supporting housing 2, which allows rotary motion of the system triangle 1 at the primary system point 1a' without changing the position of the primary system point 1a' in relation to the rectangular (Cartesian) coordinate system X, Y, Z.

Figure 4:
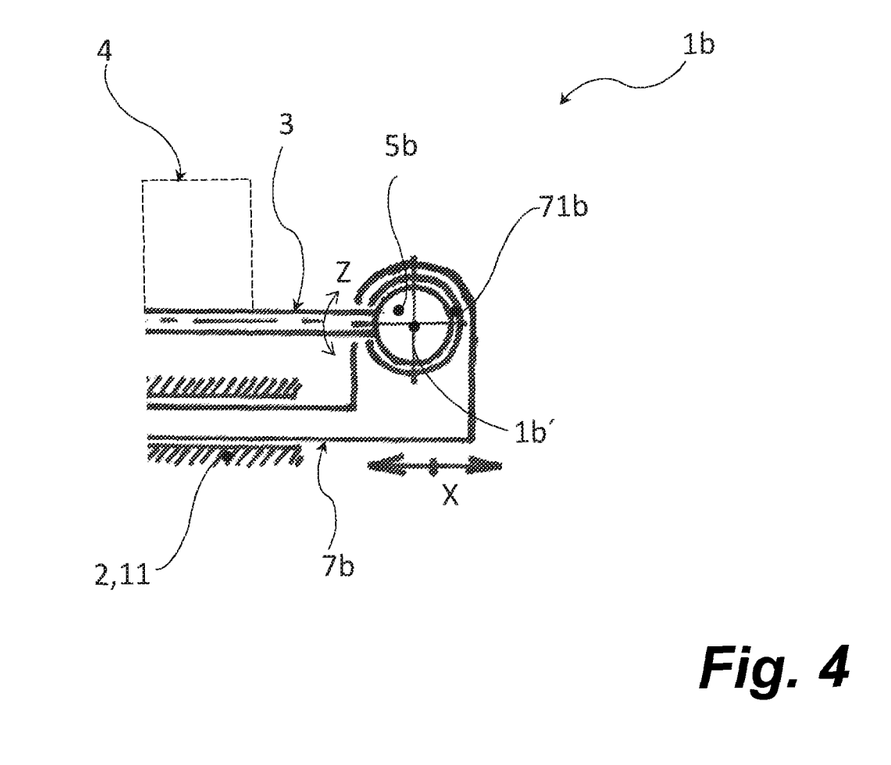
FIG. 4 is a schematic cross-sectional (section B-B') of a secondary mounting point of the system triangle of FIG. 2.
Figure 5:
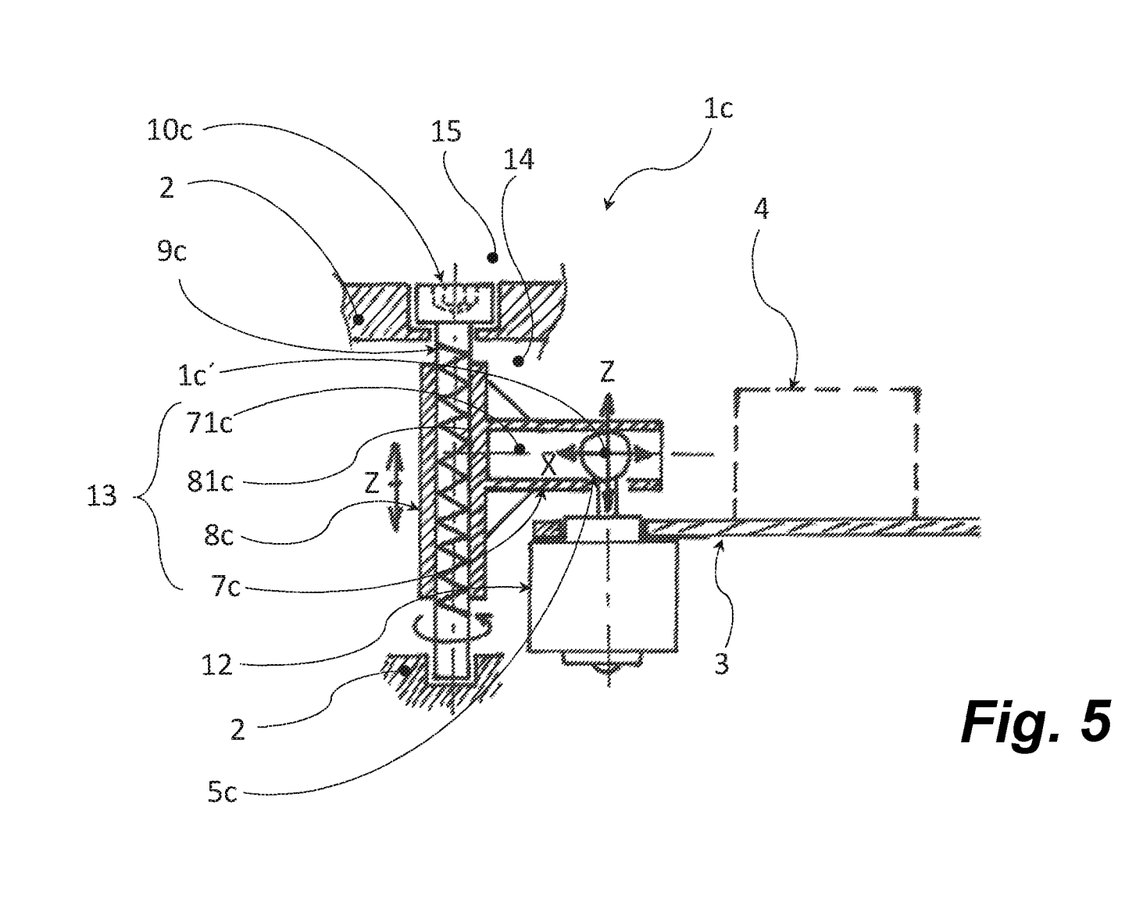
FIG. 5 is a schematic cross-sectional (section C-C') of a tertiary mounting point of the system triangle of FIG. 2.

The secondary mounting node 1b comprises a secondary ball pivot 5b, which is mounted reversibly slidably in the direction of a line connecting the first and second system points 1a', 1b', in other words, in the direction of the Y axis, and at the same time it is mounted rotatably relative to the connecting line (Y axis) in a guide rail 71b which is mounted on a secondary sliding member 7b, preferably in transverse direction. The secondary sliding member 7b is mounted reversibly slidably in the X direction in the guide in a spacing member 11. The spacing member 11 is connected to the supporting housing 2 or is formed by a part of the supporting housing 2. The secondary sliding member 7b is coupled to a secondary adjusting member 10b. For example, the secondary sliding member 7b is provided with a secondary nut 8b with an inner thread 81b in the X direction, that is in the direction of the guide in the spacing member 11, i.e., in a direction perpendicular to the Y direction. A secondary threaded rod 9b is screwed in the secondary nut 8b. The secondary threaded rod 9b is mounted rotatably about its longitudinal axis in the supporting housing 2 and is not capable of moving in the direction of its length and passes through the supporting housing 2 to the secondary adjusting member 10b. Thus, the rotary motion of the secondary threaded rod 9b is converted into sliding motion of the secondary nut 8b, of the secondary sliding member 7b, of the guide rail 71b of the secondary ball pivot 5b and of the secondary ball pivot 5b itself in the X direction. In this manner, the secondary mounting node 1b allows the sliding motion of the system triangle 1 during the change of the position of the secondary system point 1b' in the X and Y direction. According to an embodiment not shown, the secondary adjusting member 10b of the secondary system point 1b' is coupled to the secondary threaded rod 9b by means of angular gearing, e.g. a bevel gear, or a flexible shaft—bowden or cardan, etc., and so the secondary adjusting member 10b is arranged on the upper side of the outer space 15 of the supporting housing 2.

The tertiary mounting node 1c comprises a tertiary ball pivot 5c, which is reversibly slidably mounted in the guide rail 71c in the direction parallel to the plane of the system triangle 1 and at the same capable of rotating, the guide rail 71c being reversibly displaceable in a direction perpendicular to the plane of the system triangle 1 on a tertiary sliding member 7c. The tertiary sliding member 7c comprises a coupler 13, which is provided with a tertiary nut 8c with an inner thread 81c. The tertiary nut 8c with an inner thread 81c is situated in the Z direction, perpendicular to X-Y plane, whereby a tertiary threaded rod 9c is screwed in it. The tertiary threaded rod 9c is coupled to a tertiary adjusting member 10c for height positioning of the tertiary system point 1c' of the system triangle 1, i.e., for tilting the system triangle 1 about the axes determined by a line connecting the first and second system points 1a' and 1b', in other words, about the Y axis. As is apparent from FIG. 5, the tertiary ball pivot 5c is mounted on linear motor 12 for the dynamic adjustment of the inclination (tilting) of the system triangle 1 while the vehicle is in operation. The tertiary adjusting member 10c of the tertiary mounting node 1c is preferably accessible from the upper side of the outer space 15 of the supporting housing 2.

Both the adjusting members 10b, 10c are preferably oriented in the same direction and on the same side of the outer space 15 of the supporting housing 2.

Figure 1:
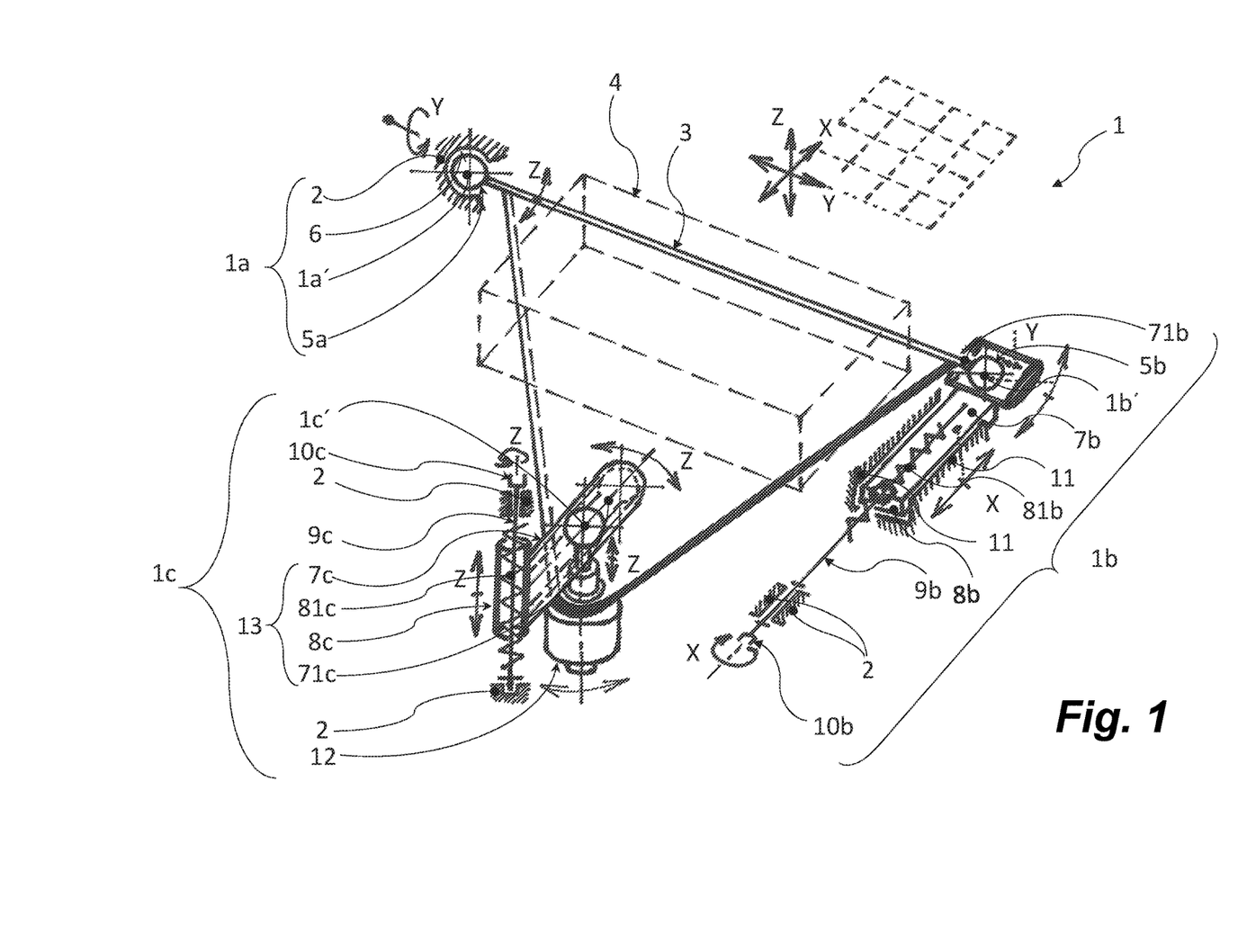
FIG. 1 is a perspective schematic top view of a system triangle of an adjustment system of an optical system of headlights.
Figure 2:
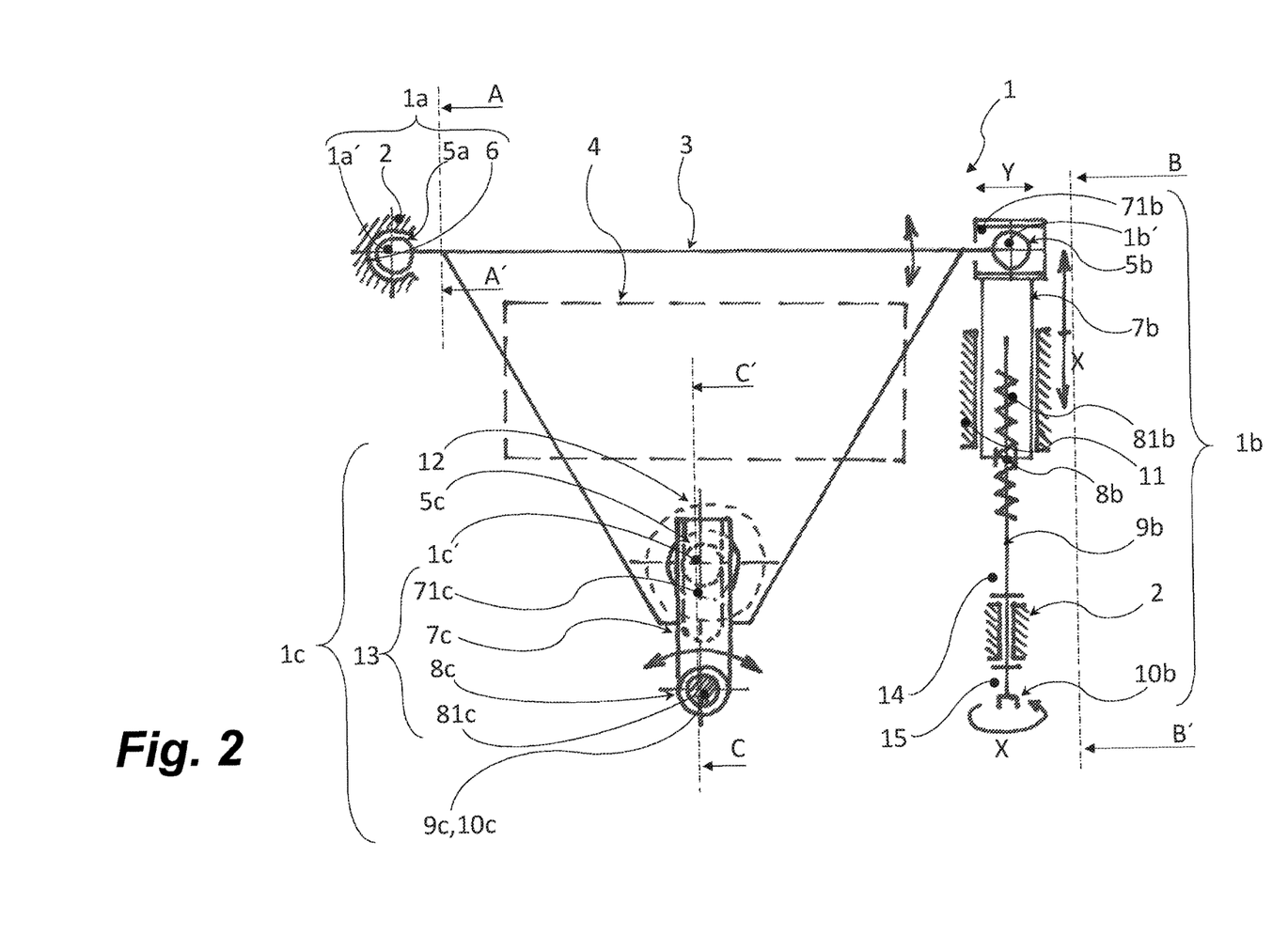
FIG. 2 is a schematic top view of the system triangle shown in FIG. 1.

In the embodiment shown, the system triangle 1 mounted in the inner space 14 of the supporting housing 2 by means of the primary, secondary a tertiary mounting nodes 1a, 1b, 1c is provided on the supporting element 3, for example, on the supporting plate to which is attached the optical unit 4 adapted to generate a light beam.

Figure 6:
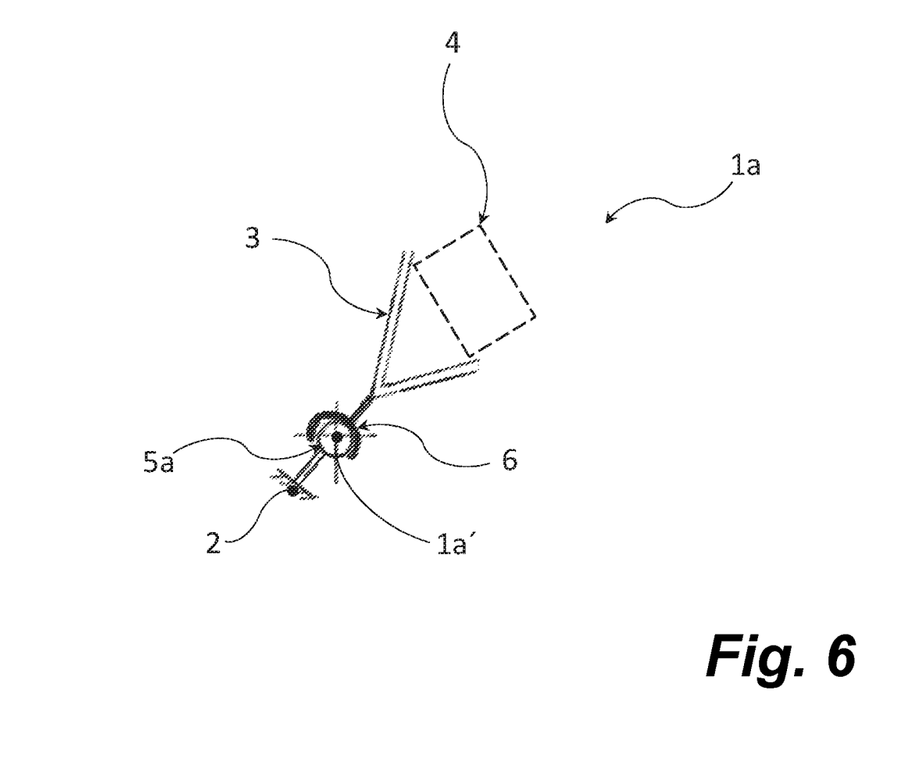
FIG. 6 represents a schematic cross-sectional view of an alternative embodiment of the primary mounting point of the system triangle.

FIG. 6 shows an alternative embodiment of the primary mounting node 1a, in which the primary ball pivot 5a characterizing the primary system point 1a' is attached to the supporting housing 2, whereby the spherical housing 6 is mounted on the supporting element 3 of the optical unit 4.

Figure 7:
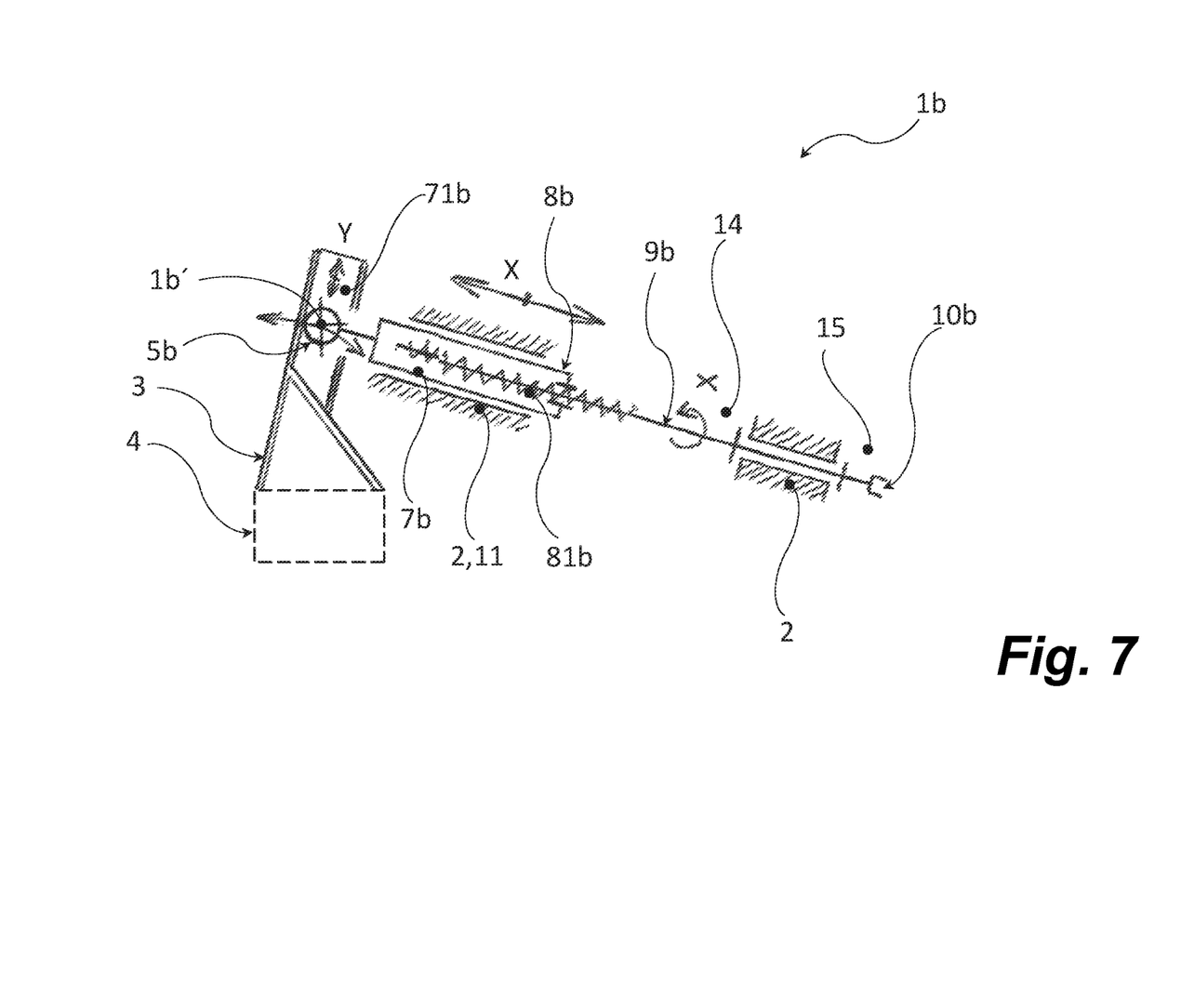
FIG. 7 is a schematic cross-sectional view of an alternative embodiment of the secondary mounting point of the system triangle.

FIG. 7 shows an alternative embodiment of the secondary mounting node 1b, in which the guide rail 71b for the secondary ball pivot 5b is mounted on the supporting element 3 of the optical unit 4, whereby the secondary ball pivot 5b is mounted on the secondary sliding member 7b, which is provided with the secondary nut 8b into which is screwed the secondary threaded rod 9b, which is mounted rotatably about its longitudinal axis and is not capable of moving in the direction of its length in the supporting housing 2, whereby the secondary threaded rod 9b passes through the supporting housing 2 to the secondary adjusting member 10b.

Figure 8:
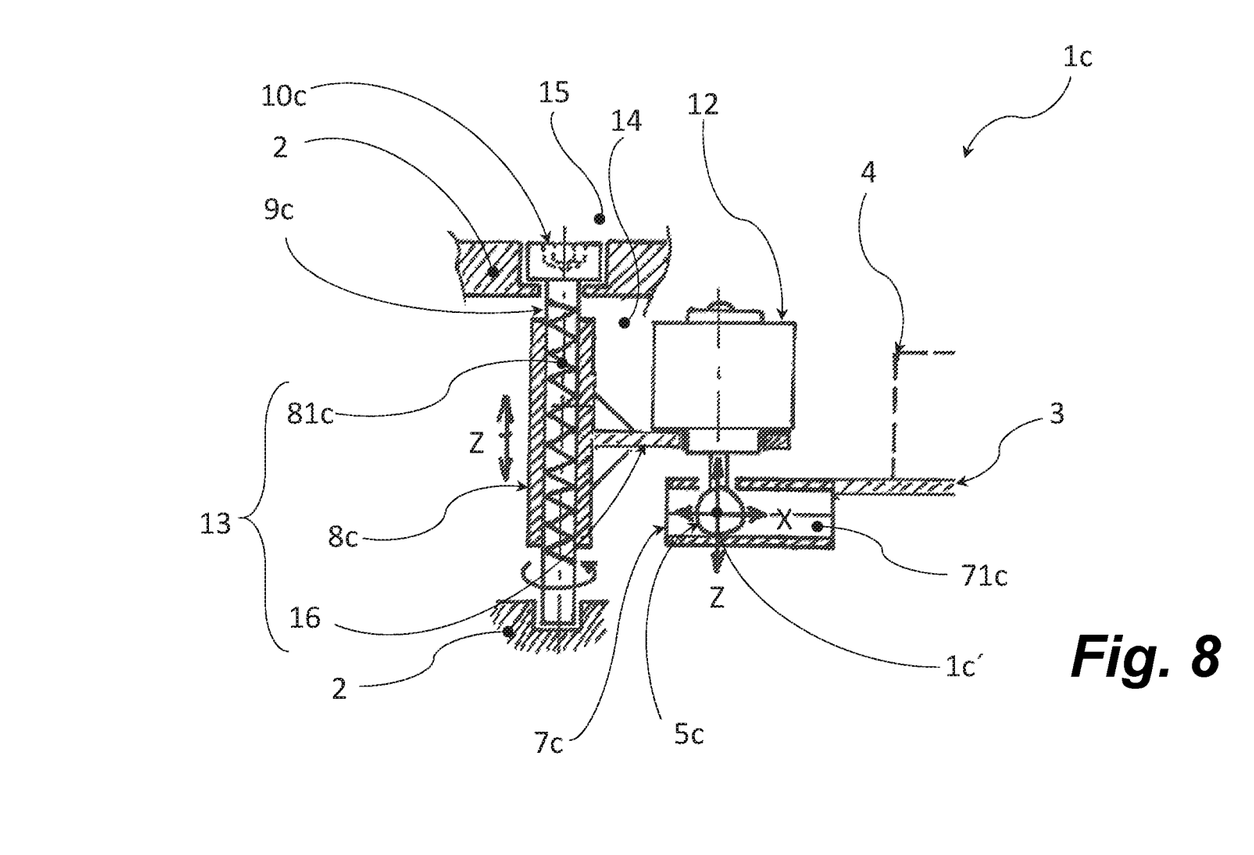
FIG. 8 and FIG. 9 show schematic cross-sectional views of an alternative embodiment of the tertiary mounting point of the system triangle.

FIG. 8 shows an alternative embodiment of the tertiary mounting node 1c, in which the linear motor 12 is attached to a bracket 16 which is fixed in the tertiary nut 8c. Mounted on the motor 12 is the tertiary ball pivot 5c, which is mounted reversibly slidably and turnably in the guide rail 71c which is mounted on the supporting element 3 of the optical unit 4.

Figure 9:
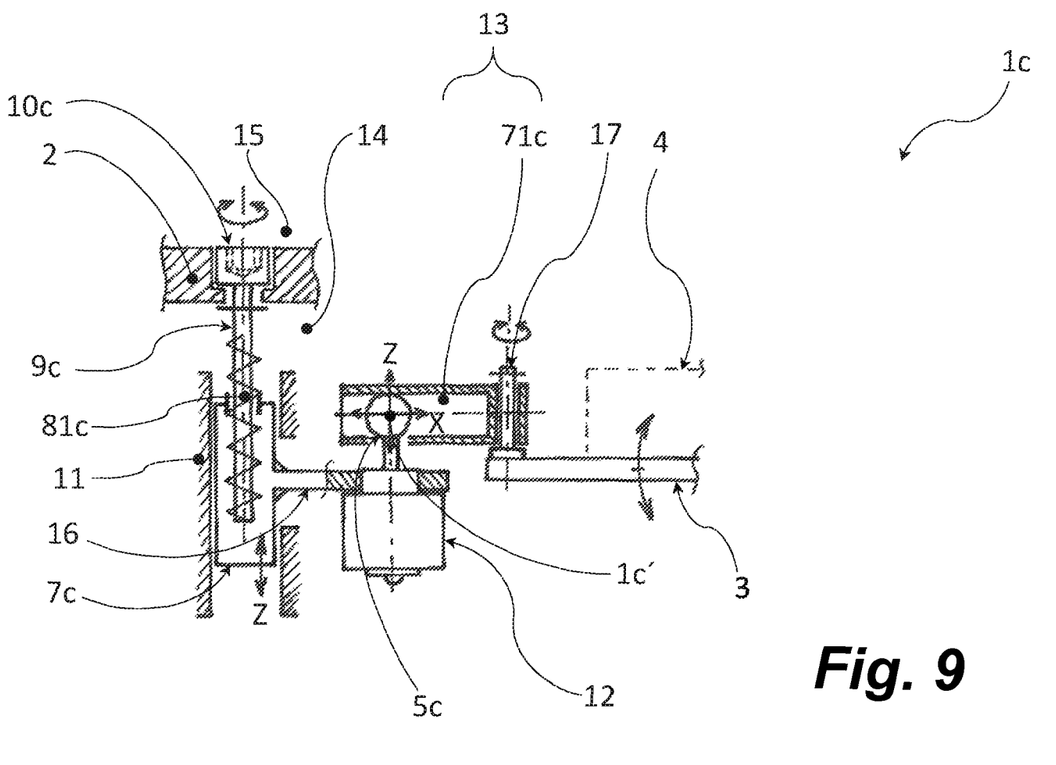

FIG. 9 shows another alternative embodiment of the tertiary mounting node 1c in which the tertiary sliding member 7c with the tertiary nut 8c with an inner thread 81c is coupled to the tertiary threaded rod 9c and the tertiary adjusting member 10c. The tertiary sliding member 7c is reversibly slidably and non-turnably mounted in the spacing member 11. The spacing member 11 is connected to the supporting housing 2, optionally the spacing member 11 is provided directly in the supporting housing 2. The tertiary sliding member 7c is provided with a transverse bracket 16, on which a linear motor 12 is mounted. The tertiary ball pivot 5c representing the tertiary system point 1c' is mounted on a movable portion of the linear motor 12. The tertiary ball pivot 5c is mounted reversibly slidably and turnably in the guide rail 71c in the coupler 13, which is mounted on the supporting element 3 of the optical unit 4, in the illustrated example of embodiment, by means of a vertically situated cylindrical pin 17, on which the coupler 13 is by one of its ends mounted rotatably about the longitudinal axis of the pin 17.

The position of the system points $1b'$, $1c'$ can be controllably changed by means of the mounting nodes $1b$, $1c$ of the system triangle 1 connected to two separate adjusting members $10b$, $10c$, which are during the adjustment of the position of the optical unit 4, or, more specifically, its supporting element 3, accessible from the outer space 15 of the supporting housing 2.

The primary mounting node $1a$ allows rotary motion of the system triangle 1 in the directions of the coordinate system X, Y, Z without changing the position of the primary system point $1a'$, which means that the primary system point $1a'$ determines the center of rotation of the system triangle 1.

The secondary mounting node $1b$ allows the motion of the secondary system point $1b'$ in the direction of the X and Y axes and, at the same time, allows the rotary motion of the system triangle 1 about the line connecting the primary and secondary system points $1a'$ and $1b'$, in other words, about the axis Y.

The tertiary mounting node $1c$ allows the motion of the tertiary system point $1c'$ in all directions of the coordinate system X, Y, Z, which allows the rotation of the system triangle 1 relative to the horizontal X-Y plane, as well as to the vertical X-Z plane.

The invention operates in such a manner that as soon as the secondary adjusting member $10b$ of the secondary mounting node $1b$ is manipulated during the adjustment of the headlight, this causes the motion of the secondary and tertiary system points $1b'$, $1c'$ along a circular path about the primary system point $1a'$, i.e. about the Z axis, thereby changing the position of the secondary and tertiary system points $1b'$, $1c'$ in the X and Y directions. As a result of this motion of the secondary and tertiary system points $1b'$, $1c'$, the system triangle 1 turns at the primary system point $1a'$ about the Z axis. Thus, the adjustment of the direction of the light beam generated by the optical unit 4 in the X-Y plane is changed in relation to the longitudinal direction of the vehicle.

As soon as the tertiary adjusting member $10c$ of the tertiary mounting node $1c$ is manipulated during the adjustment of the headlight, this results in the motion of the tertial system point $1c'$ in the Z axis, when the system triangle 1 rotates about the Y axis by means of the primary and secondary ball pivots $5a$ and $5b$, i.e. at the secondary system point $1a'$, $1b'$, while the tertiary system point $1c'$ moves up or down. This changes the adjustment of the direction of the light beam generated by the optical unit 4 in the X-Z plane, i.e. the inclination of the direction of the light beam generated by the optical unit 4, i.e., in relation to the X-Y plane.

The dynamic adjustment of the horizontal direction of the light beam generated by the optical unit 4 is performed during the operation by the means of the motor 12, which, like the tertiary adjusting member $10c$, changes the vertical position of the tertiary ball pivot $5c$ and hence also the vertical position of the tertiary system point $1c'$ with the simultaneous motion of the primary and secondary ball pivots $5a$, $5b$ in the primary and secondary mounting nodes $1a$, $1b$ without directional shift of both the primary and secondary system points $1a'$, $1b'$.

INDUSTRIAL APPLICABILITY

The invention is applicable in the production of headlights for motor vehicles and in the production and maintenance of the vehicles.

LIST OF REFERENCES

1—system triangle
$1a$—primary mounting node
$1b$—secondary mounting node
$1c$—tertiary mounting node
$1a'$—primary system point
$1b'$—secondary system point
$1c'$—tertiary system point
2—supporting housing
3—supporting element
4—the optical unit
$5a$—primary ball pivot
$5b$—secondary ball pivot
$5c$—tertiary ball pivot
6—spherical housing
$7b$—secondary sliding member
$7c$—tertiary sliding member
$71b$—secondary guide rail
$71c$—tertiary guide rail
$8b$—secondary nut
$8c$—tertiary nut
81—thread
$9b$—secondary threaded rod
$9c$—tertiary threaded rod
$10b$—secondary adjusting member
$10c$—tertiary adjusting member
11—spacing member
12—motor
13—coupler
14—inner space of the supporting housing
15—outer space of the supporting housing
16—bracket
17—pin
X, Y, Z—axes of Cartesian coordinate system
x—optical axis of the headlight

The invention claimed is:

1. A headlight for motor vehicles comprising a supporting housing adapted for securing an optical unit, wherein the optical unit is in the inner space of the supporting housing mounted on three displaceable mounting nodes, each of which comprises one system point and the system points are grouped together constituting a system triangle, whereby at least some mounting nodes are coupled to adjusting members located in the outer space of the supporting housing, wherein a primary mounting node is provided with means for turning the system triangle without changing the position of the primary system point, a secondary mounting node is provided with means for changing the position of the secondary system point in the horizontal plane and a tertiary mounting node is provided with means for changing the position of the tertiary system point in all directions of the coordinate system.

2. The headlight for motor vehicles according to claim 1, wherein the primary mounting node comprises a primary ball pivot rotatably mounted in a spherical housing.

3. The headlight for motor vehicles according to claim 1, wherein the secondary mounting node comprises a secondary ball pivot, which is reversibly slidably mounted in a secondary guide rail in the direction of a line connecting the first and second system points and the same time is capable of turning relative to this connecting line, whereby the secondary guide rail is arranged on a secondary sliding member, which is reversibly slidably mounted in the direction X in the guide arranged on the supporting housing, the secondary sliding member being coupled to a secondary adjusting member.

4. The headlight for motor vehicles according to claim 3, wherein the secondary sliding member is provided with a secondary nut with an inner thread, in which is screwed a secondary threaded rod which is mounted rotatably about its longitudinal axis in the supporting housing, not being capable of moving in the direction of its length, and passes through the supporting housing to the secondary adjusting member.

5. The headlight for motor vehicles according to claim 1, wherein the secondary mounting node comprises a secondary ball pivot, which is mounted on the secondary sliding member, which is provided with a secondary nut in which is screwed the secondary threaded rod, which is mounted rotatably about its longitudinal axis in the supporting housing, not being capable of moving in the direction of its length, and is coupled to the secondary adjusting member on the outer side of the supporting housing, whereby the secondary ball pivot is mounted reversibly slidably and turnably in the guide rail, the guide rail being mounted on the supporting element of the optical unit.

6. The headlight for motor vehicles according to claim 1, wherein the tertiary mounting node comprises a tertiary ball pivot, which is mounted reversibly slidably in the horizontal plane and the same time is capable of turning in a tertiary guide rail of a tertiary sliding member, which is reversibly slidable in the vertical direction and is coupled to a tertiary adjusting member on the outer side of the supporting housing.

7. The headlight for motor vehicles according to claim 6, wherein the tertiary sliding member is coupled to a tertiary nut, which is situated in the horizontal direction, whereby a tertiary threaded rod is screwed in it and coupled to the tertiary adjusting member.

8. The headlight for motor vehicles according to claim 6, wherein a tertiary ball pivot is mounted on a linear motor for the dynamic adjustment of the inclination of the system triangle while the vehicle is in operation.

9. The headlight for motor vehicles according to claim 1, wherein the tertiary mounting node comprises the tertiary ball pivot, which is mounted on the motor, which is mounted on a bracket, which is fixed in the tertiary nut situated in the horizontal direction, whereby the tertiary threaded rod is screwed in it and is coupled to the tertiary adjusting member on the outer side of the supporting housing and the tertiary ball pivot is mounted in the horizontal plane reversibly slidably and turnably in the tertiary guide rail, which is mounted on the supporting element of the optical unit.

10. The headlight for motor vehicles according to claim 1, wherein the tertiary mounting node comprises the tertiary ball pivot, which is mounted on the linear motor, which is mounted on a transverse bracket arranged on the tertiary sliding member, which is reversibly slidably coupled to the supporting housing and is further coupled to the tertiary nut, in which is screwed the tertiary threaded rod coupled to the tertiary adjusting member, whereby the tertiary ball pivot is reversibly slidably and turnably mounted in the tertiary guide rail on the coupler, the coupler being mounted on the supporting element of the optical unit.

* * * * *